May 4, 1926.
F. E. SCHIER
LINE BELT DRIVE
Filed July 11, 1924  2 Sheets-Sheet 1
1,583,186
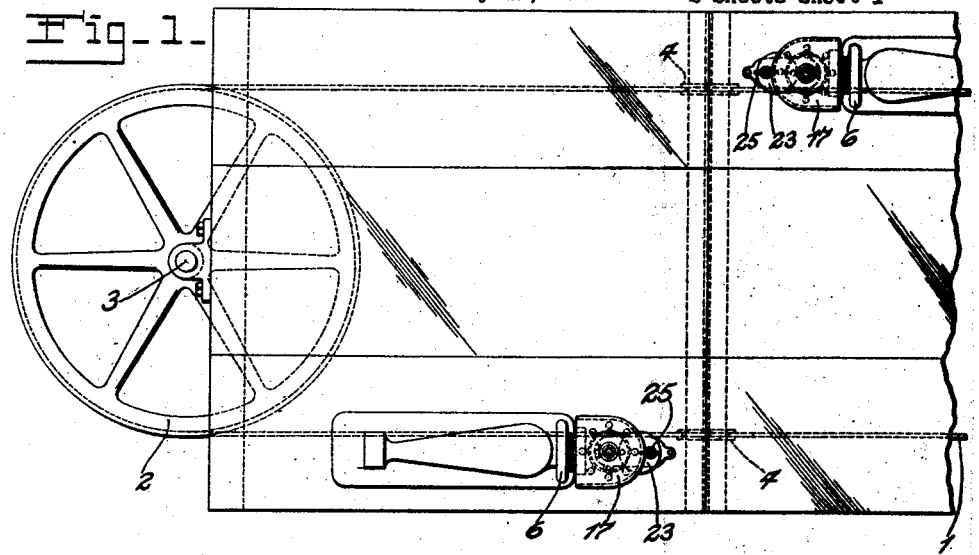
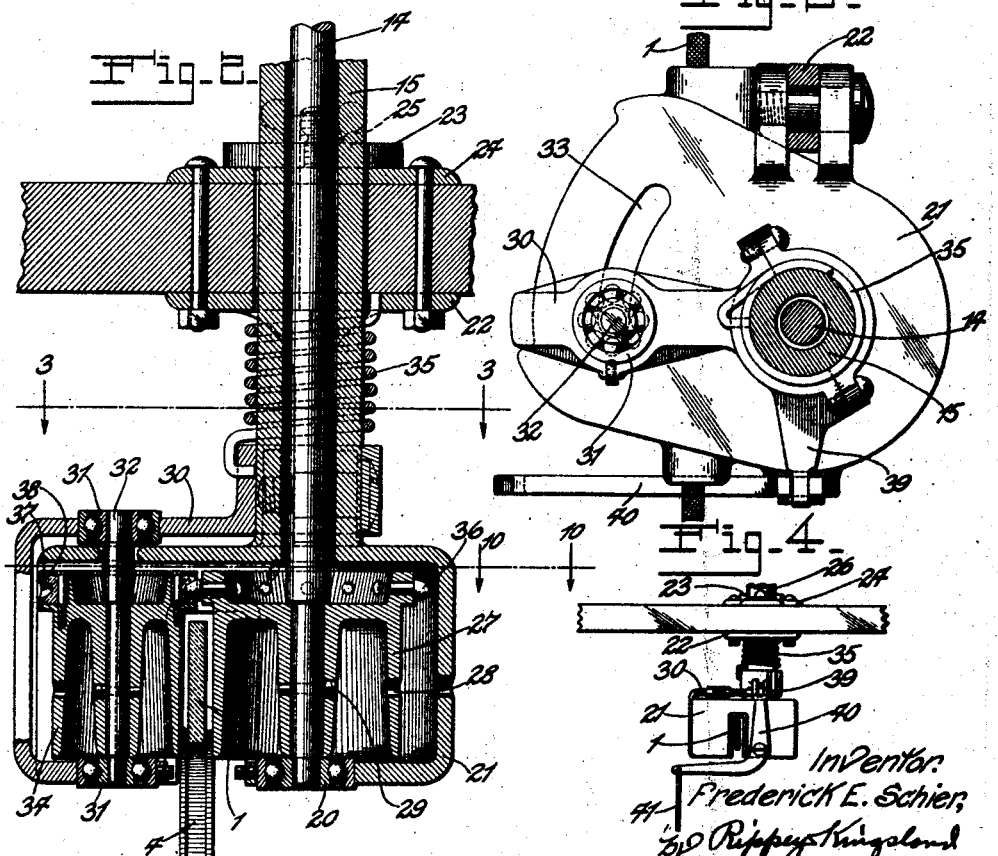
Inventor.
Frederick E. Schier,
by Rippey Kingsland
His Attorneys.

May 4, 1926.
F. E. SCHIER
LINE BELT DRIVE
Filed July 11, 1924   2 Sheets-Sheet 2
1,583,186
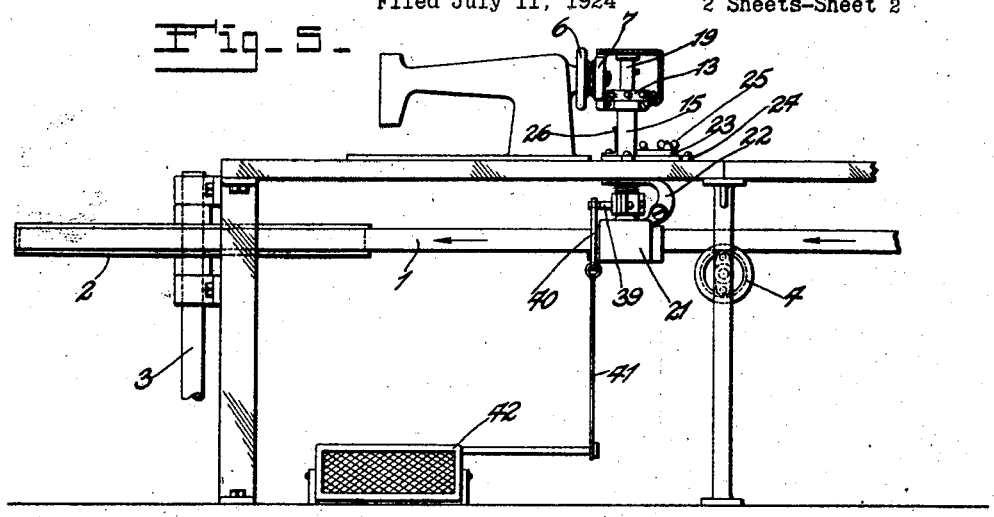
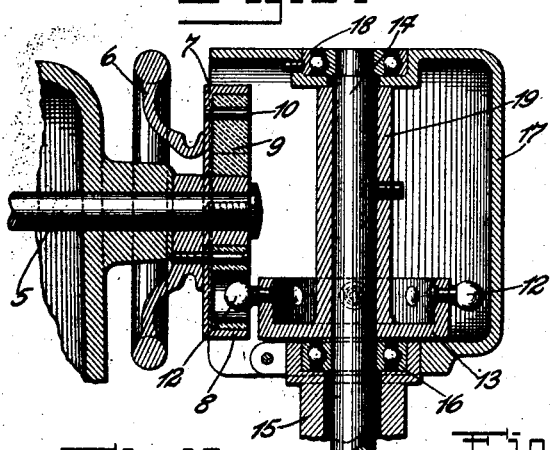
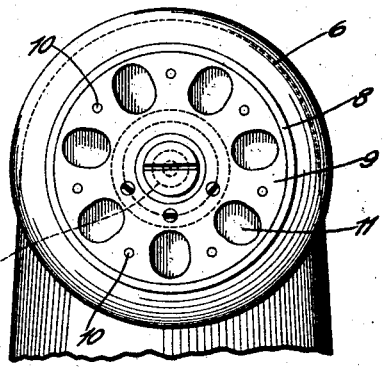
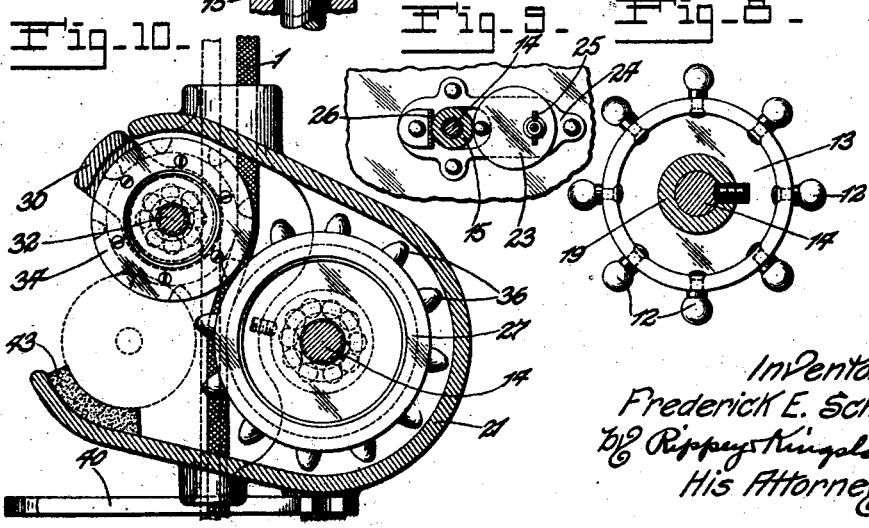
Inventor:
Frederick E. Schier,
by Rippey & Kingsland
His Attorneys.

Patented May 4, 1926.

1,583,186

UNITED STATES PATENT OFFICE.

FREDERICK E. SCHIER, OF ST. LOUIS, MISSOURI.

LINE-BELT DRIVE.

Application filed July 11, 1924. Serial No. 725,383.

*To all whom it may concern:*

Be it known that I, FREDERICK E. SCHIER, a citizen of the United States, and a resident of the city of St. Louis, Missouri, have invented a new and useful Line-Belt drive, of which the following is a specification.

This invention relates to line belt drives.

An object of the invention is to provide means whereby any selected number of machines may be driven from a single belt.

Another object of the invention is to provide a driving device for co-operation with a belt comprising a pair of cooperating pulleys, one of which is arranged to operate the driving mechanism of a machine and the other of which is to control the operation of the first one by the belt.

Another object of the invention is to provide improved means for effecting and for releasing frictional engagement of the belt with the pulley that operates the machine.

Another object of the invention is to provide means for reversing the direction of operation of the machine without changing the direction of operation of the belt driven pulley.

Various other objects will appear from the following description, reference being made to the drawings in which—

Fig. 1 is a plan view of the invention arranged to operate a number of sewing machines from a single belt.

Fig. 2 is an enlarged sectional view of the belt driven mechanism.

Fig. 3 is a sectional view on the line 3—3 of Fig. 2.

Fig. 4 is a side elevation of the mechanism shown in Fig. 2.

Fig. 5 is a side elevation of Fig. 1.

Fig. 6 is a sectional view of the mechanism for driving the machine from the pulley driven shaft.

Fig. 7 is a side elevation of an improved form of wheel for use in connection with the driven machine.

Fig. 8 is a plan view of an improved form of gear wheel for use on the driven shaft to operate the wheel shown in Fig. 7.

Fig. 9 is a plan view of the device for holding the wheel of Fig. 8 in engagement with the wheel of Fig. 7 and for permitting disengagement of said wheels.

Fig. 10 is a sectional view on the line 10—10 of Fig. 2.

The belt 1 is operated on wheels or pulleys 2, one of which is on a power driven shaft 3. While I have shown the belt mounted below the table that supports the machines to be operated, I do not restrict myself in this particular but contemplate such variations in the position and location of the belt as may be desirable to obtain best results. The belt operates upon supporting wheels 4.

For purposes of illustration I have shown the belt arranged to operate a number of sewing machines of a familiar type, each of which is made with an operating shaft 5 (Fig. 6). The shaft 5 of said machine is usually provided with a wheel 6. The present invention cooperates with the wheel 6 to operate the machine and comprises a plate 7 having a circumferential flange 8 which encloses a disc 9 of leather, or other similar material, that is attached to the plate 7 by rivets 10. The disc 9 is formed with an annular series of oblong holes 11 which receive ball teeth 12 attached to a disc 13.

By this construction compensation is made for vibration when the machine is in operation and the noise that would result from meshing of metallic gears is avoided.

A shaft 14 extends vertically through the table top within a shaft housing 15 which supports an anti-friction bearing 16 near its upper end. A housing 17 is supported by the upper end of the shaft housing 15 to enclose the devices for driving the machine from the shaft 14; and the upper wall of said housing 17 has an anti-friction bearing 18 for the upper end of the shaft 14. The disc 13 has a hub 19. The disc 13 may be mounted on the shaft 14 in the relationship shown in Fig. 6 in which the engagment with the wheel on the shaft 5 is below said shaft 5 to operate the sewing machine in one direction; or, the disc 13 may be mounted in an inverted position from that shown in Fig. 6 to engage the wheel on the shaft 5 above said shaft 5 to operate the machine in the other direction. The housing 17 is removable from the shaft 14 with the disc 13 to permit change of position of said disc on said shaft.

The lower end of the shaft 14 is journaled in an anti-friction bearing 20 (Fig. 2) supported by the lower end of a pulley housing 21 carried by the shaft housing 15. The pulley housing is pivoted to a bracket arm 22 (Fig. 5) attached to the table and permitting the shaft housing 5 to swing to move the wheel 12—13 into or out of operative engagement with the wheel on the machine shaft 5 and to permit the housing 17 to be removed and replaced when it is desired to change the position of the wheel 12—13 thereon. The parts may be held in operative engagement by a retaining device comprising a plate 23 (Fig. 9) pivoted to a support 24 on the table and movable from the position shown to a position in which the shaft housing 15 and parts supported thereby may be swung laterally away from the machine to permit the adjustment stated. A clamping device 25 may be employed to hold the part 23 in the position shown against an abutment 26.

The lower end of the shaft 14 has a pulley 27 attached thereto (Fig. 2) in position to be engaged by the belt 1 when said belt is flexed laterally toward the pulley 27. Holes 28 through the housing 21 and through the pulley 27 afford access to the pin or screw 29 by which the pulley 27 is affixed to the shaft 14.

A bracket 30 is pivoted to the shaft housing 15 above the pulley housing 21 and supports a pair of alined anti-friction bearings 31, one of which is above the housing 21 and one of which is below the plane of the lower edge of the belt 1. A shaft 32 extending through an arcuate slot 33 in the upper wall of the housing 21 is journaled in the bearings 31 and has attached thereto a pulley 34 in the opposite side of the belt 1 from the pulley 27 and spaced therefrom in one position a sufficient distance to permit the belt only to pass between said pulleys without contact with either of them. However, the bracket 30 is operative in a direction to cause the pulley 34 to contact with and press the belt 1 into engagement with the pulley 27, so that the belt will turn both pulleys and will cause the driving connections to operate the machine.

A spring 35 is coiled around the shaft housing 15 having one end attached to the bracket 22 and the opposite end attached to the bracket 30. The power of said spring is exerted to hold the pulley 34 in position in which it is out of contact with the belt 1 (Figs. 2 and 3) so that said belt may move between said pulleys without contact with either of them. The pulleys 27 and 34 are operatively connected by rounded teeth 36 on one engaging in recesses 37 in a ring 38 of leather or the like on the other. This provides silent operation.

The bracket 30 has an arm 39 (Figs. 3 and 4) engaged by the bifurcated upper end of a bell crank lever 40 pivoted to the housing 21. The opposite end of the bell crank lever 40 is connected by a link 41 with an operating treadle 42. When the treadle is depressed the connections described will operate the bracket 30 to cause the belt 1 to effect operative engagement with the pulleys 27 and 34.

When the treadle is released the spring 35 acts automatically to move the pulley 34 to a position in which the belt 1 is permitted to operate out of contact with either pulley. The pulley 34 is moved into engagement with the brake device 43 (Fig. 10) which stops rotation of both pulleys since they are operatively engaged with each other.

From the foregoing it will be seen that my invention obtains all of its intended objects and purposes and is capable of wide variation as to form and environment, without departure from the nature and principle of the invention. It may also be applied to various uses and, since the operative parts are enclosed, the operator is at all times protected.

I do not restrict myself unessentially in any particulars, but what I claim and desire to secure by Letters Patent is:—

1. A line belt drive for operating a number of machines comprising a belt, a pair of pulleys between which said belt operates, means for moving one of said pulleys in a direction to press the belt against the other, and gearing for rotating one of said pulleys by the other.

2. A line belt drive for operating a number of machines comprising a belt, a pair of pulleys between which said belt operates, means for moving one of said pulleys in a direction to press the belt against the other, and connections operated by said other pulley for operating a machine.

3. A line belt drive comprising a belt, a pair of pulleys between which said belt operates, means for moving one of said pulleys in a direction to press the belt against the other, and means for moving said first pulley out of contact with the belt.

4. A line belt drive comprising a belt, a pair of pulleys between which said belt operates, means for moving one of said pulleys in a direction to press the belt against the other, means for moving said first pulley out of contact with the belt, and a brake device for one of said pulleys.

5. A line belt drive comprising a belt, a pair of pulleys between which said belt operates, means for moving one of said pulleys in a direction to press the belt against the other pulley, and parts on one of said pulleys engaging the other pulley.

6. A line belt drive comprising a belt, a pair of pulleys between which said belt operates, means for moving one of said pulleys in a direction to press the belt against the other pulley, parts on one of said pulleys engaging the other pulley, means for moving the first pulley out of contact with the belt, and a brake device for one of said pulleys.

7. A line belt drive comprising a belt, a shaft, a pulley attached to said shaft at one side of said belt, a swinging support, a pulley mounted in said support at the opposite side of said belt from said first pulley, and means for actuating said support to effect engagement of said belt with both of said pulleys.

8. A line belt drive comprising a belt, a shaft, a pulley attached to said shaft at one side of said belt, a swinging support, a pulley mounted in said support at the opposite side of said belt from said first pulley, means for actuating said support to effect engagement of said belt with both of said pulleys, and means for actuating said support to move said second pulley to position to permit said belt to operate out of contact with both of said pulleys.

9. A line belt drive comprising a belt, a shaft, a pulley attached to said shaft at one side of said belt, a swinging support, a pulley mounted in said support at the opposite side of said belt from said first pulley, means for actuating said support to effect engagement of said belt with both of said pulleys, means for actuating said support to move said second pulley to position to permit said belt to operate out of contact with both of said pulleys, elements on one of said pulleys engaging the other pulley, and a brake device for stopping rotation of one of said pulleys when said second pulley is moved out of contact with said belt.

10. A line belt drive comprising a belt, a shaft, connections for operating a machine from said shaft, a pulley attached to said shaft at one side of said belt, a pulley supported at the opposite side of said belt for swinging movements into and out of contact with said belt, and means for operating said second pulley to engage said belt with both of said pulleys.

11. A line belt drive comprising a belt, a shaft, connections for operating a machine from said shaft, a pulley attached to said shaft at one side of said belt, a pulley supported at the opposite side of said belt for swinging movements into and out of contact with said belt, means for operating said second pulley to engage said belt with both of said pulleys, means for rotating one of said pulleys by the other, and a brake device for stopping rotation of said pulleys when said second pulley is moved to position out of contact with said belt.

12. A line belt drive comprising a belt, a shaft, a pulley attached to said shaft at one side of said belt and normally out of contact with said belt, and means for flexing the belt into contact with said pulley.

13. A line belt drive comprising a belt, a shaft, a pulley attached to said shaft at one side of said belt and normally out of contact with said belt, means for flexing the belt into contact with said pulley, a machine element, and means for operating said machine element from said shaft.

14. A line belt drive comprising a shaft, a machine element, mechanism for driving said machine element from said shaft, a pulley attached to said shaft, a second pulley supported for swinging movements around the axis of said first pulley, a belt operating between and normally out of contact with said pulleys, and mechanism for swinging said second pulley to engage said belt and to press said belt into contact with said first pulley.

15. A line belt drive comprising a shaft, a machine element, mechanism for driving said machine element from said shaft, a pulley attached to said shaft, a second pulley supported for swinging movements around the axis of said first pulley, a belt operating between and normally out of contact with said pulleys, mechanism for swinging said second pulley to engage said belt and to press said belt into contact with said first pulley, and means for rotating one of said pulleys from the other.

16. A line belt drive comprising a shaft, a machine element, mechanism for driving said machine element from said shaft, a pulley attached to said shaft, a second pulley supported for swinging movements around the axis of said first pulley, a belt operating between and normally out of contact with said pulleys, mechanism for swinging said second pulley to engage said belt and to press said belt into contact with said first pulley, means for rotating one of said pulleys from the other, and means for moving said second pulley out of contact with said belt to position to permit said belt to move out of contact with said first pulley.

17. A line belt drive comprising a shaft, a machine element, mechanism for driving said machine element from said shaft, a pulley attached to said shaft, a second pulley supported for swinging movements around the axis of said first pulley, a belt operating between and normally out of contact with said pulleys, mechanism for swinging said second pulley to engage said belt and to press said belt into contact with said first pulley, means for rotating one of said pulleys from the other, means for moving said second pulley out of contact with said belt to position to permit said belt to move out of contact with said first pulley, and a brake device for stopping and preventing rotation of said pulleys when said belt is out of contact therewith.

18. A line belt drive comprising a machine element to be driven, a shaft, means for supporting said shaft for swinging movements toward and away from said machine element, means for driving said machine element from said shaft, a pulley attached to said shaft, a belt supported for movement in a line out of contact with said pulley, and means for bending said belt laterally into contact with said pulley.

19. A line belt drive comprising a belt, a pulley at one side of said belt, means for driving a machine element from said pulley, a device for bending said belt laterally into contact with said pulley, means for moving said device to position to permit said belt to operate out of contact with said pulley, and a brake device for stopping rotation of said pulley.

20. A line belt drive comprising a shaft housing, a shaft supported for rotation in said housing, means for driving a machine element from said shaft, a belt, a pulley attached to said shaft within said housing at one side of said belt, a swinging support, a pulley carried by said swinging support at the opposite side of said belt from said first pulley, and means for operating said swinging support and said second pulley to cause said second pulley to engage said belt and to press said pulley into engagement with said first pulley.

21. A line belt drive comprising a shaft housing, a shaft supported for rotation in said housing, means for driving a machine element from said shaft, a belt, a pulley attached to said shaft within said housing at one side of said belt, a swinging support, a pulley carried by said swinging support at the opposite side of said belt from said first pulley, means for operating said swinging support and said second pulley to cause said second pulley to engage said belt and to press said pulley into engagement with said first pulley, gear mechanism connecting said pulleys, and a brake device for stopping rotation of one of said pulleys when said pulleys are out of contact with said belt.

22. A line belt drive comprising a shaft housing, a shaft supported for rotation in said housing, means for driving a machine element from said shaft, a belt, a pulley attached to said shaft within said housing at one side of said belt, a swinging support, a pulley carried by said swinging support at the opposite side of said belt from said first pulley, means for operating said swinging support and said second pulley to cause said second pulley to engage said belt and to press said pulley into engagement with said first pulley, gear mechanism connecting said pulleys, a brake device for stopping rotation of one of said pulleys when said pulleys are out of contact with said belt, and automatic means for moving said swinging support and said second pulley to position in which said second pulley is out of contact with said belt to permit said belt to move out of contact with said first pulley.

23. A line belt drive comprising a pivoted support movable to and from a definite position, a shaft carried by said support, means for driving a machine element from said shaft when said support is in definite position, a pulley attached to said shaft, a belt, and means for bending said belt transversely of the axis of said pulley into contact with said pulley.

24. A line belt drive comprising a pulley, a belt supported for operation in contact or wholly out of contact with said pulley as desired, and means for bending said belt transversely of the axis of and into contact with said pulley.

25. A line belt drive comprising a belt, a pair of spaced pulleys one of which is at each side of said belt, and means for moving one of said pulleys into contact with said belt to bend said belt into contact with the other pulley.

26. A line belt drive comprising a belt, a pair of spaced pulleys one of which is at each side of said belt, means for moving one of said pulleys into contact with said belt to bend said belt into contact with the other pulley, means for moving said first named pulley out of contact with said belt to permit said belt to operate out of contact with said other pulley, and a brake device for stopping rotation of said pulleys.

27. A line belt drive comprising a pair of spaced pulleys, means for rotating one of said pulleys from the other, a belt operating between said pulleys, and means for operating one of said pulleys to effect engagement of said belt with both of said pulleys.

28. A line belt drive comprising a pair of spaced pulleys, means for rotating one of said pulleys from the other, a belt operating between said pulleys, means for operating one of said pulleys to effect engagement of said belt with both of said pulleys, and a brake device for stopping rotation of said pulleys when they are out of contact with said belt.

FREDERICK E. SCHIER.